United States Patent
Baramov et al.

(10) Patent No.: US 7,447,587 B2
(45) Date of Patent: Nov. 4, 2008

(54) CYLINDER TO CYLINDER VARIATION CONTROL

(75) Inventors: Lubmir Baramov, Prague (CZ); Vladimir Havlena, Prague (CZ); Michael L. Rhodes, Richfield, MN (US); Tariq Samad, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/612,211

(22) Filed: Dec. 18, 2006

(65) Prior Publication Data

US 2007/0142999 A1    Jun. 21, 2007

Related U.S. Application Data

(60) Provisional application No. 60/753,197, filed on Dec. 21, 2005.

(51) Int. Cl.
*G06F 17/00* (2006.01)
*F02D 41/14* (2006.01)

(52) U.S. Cl. .................. 701/109; 701/104; 701/108; 123/568.21

(58) Field of Classification Search ............ 701/109, 701/108, 114, 102; 123/568.21; 73/28.02
See application file for complete search history.

(56) References Cited

U.S. PATENT DOCUMENTS

| | | | |
|---|---|---|---|
| 6,778,898 B1 * | 8/2004 | Bidner et al. | 701/109 |
| 6,971,258 B2 | 12/2005 | Rhodes et al. | |
| 7,155,334 B1 | 12/2006 | Stewart et al. | |
| 7,182,075 B2 | 2/2007 | Shahed et al. | |
| 7,184,880 B2 * | 2/2007 | Haluska | 701/114 |
| 7,231,290 B2 * | 6/2007 | Steichen et al. | 701/109 |
| 2004/0039514 A1 | 2/2004 | Steichen | |
| 2004/0162666 A1 | 8/2004 | Bidner | |

FOREIGN PATENT DOCUMENTS

EP    0 105 828 A2 *    4/1984
JP    2002-364398 A *    12/2002

OTHER PUBLICATIONS

PCT International Search Report and Written Opinion for corresponding international application No. PCT/US 06/48386, Dec. 3, 2007.

* cited by examiner

*Primary Examiner*—Hieu T Vo
(74) *Attorney, Agent, or Firm*—Kris T. Fredrick

(57) ABSTRACT

Method and system for controlling cylinder to cylinder variations of undesirable emissions in exhaust gas of engines with exhaust gas recirculation. An engine model is used to predict the intake composition of the next cylinder firing based on the composition of the exhaust, as a function of time and applicable engine conditions. At least one engine parameter is adjusted to compensate for the predicted intake composition in order to minimize cylinder to cylinder variations.

20 Claims, 4 Drawing Sheets

CYLINDER TO CYLINDER VARIATION CONTROL

This invention claims the benefit of the filing date of U.S. Provisional Application Ser. No. 60/753,197 filed on 21 Dec. 2005, incorporated herein by reference.

BACKGROUND

This invention pertains to electronic engine control. Some embodiments concern controlling the cylinder to cylinder variations of emissions of particulate matter and of oxides of nitrogen in exhaust gas of turbodiesel engines with exhaust gas recirculation. Other embodiments concern other engines, such as gasoline engines. Control is based on a periodic model instead of (or in addition to) being based on a cycle-averaged model.

Reducing cylinder to cylinder variations will reduce the average output of particulate matter and of oxides of nitrogen, and also will enable achieving a better trade-off between conflicting requirements for fuel economy and for emissions of particulate matter and of oxides of nitrogen.

DETAILED DESCRIPTION OF SOME EMBODIMENTS

Figure 1:
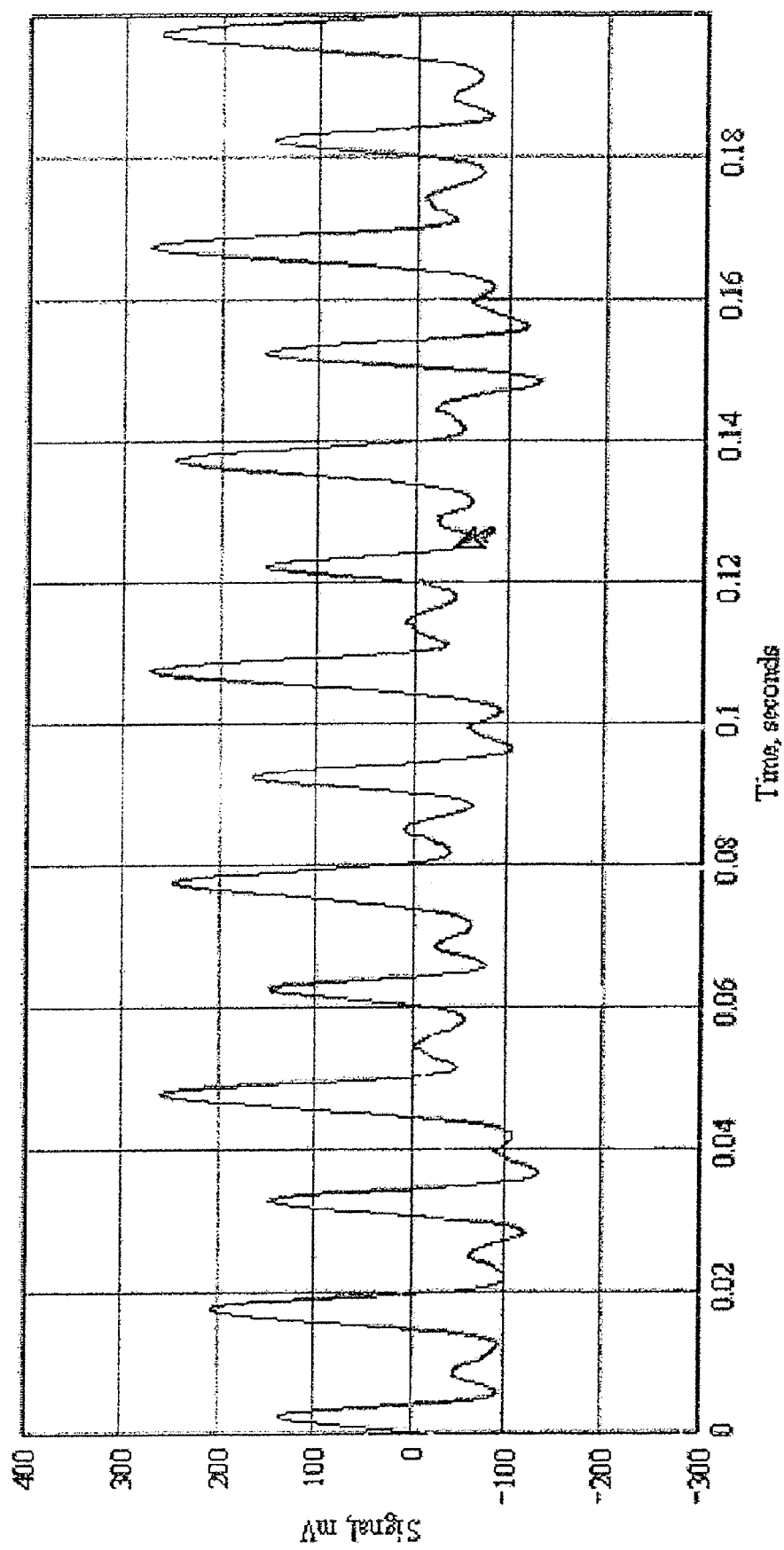
FIG. 1 is a graph showing actual data from a test engine.

While the present invention is susceptible of embodiment in various forms, there is shown in the drawings and will hereinafter be descried some embodiments with the understanding that the present disclosure is to be considered an exemplification of the invention and is not intended to limit the invention to the specific embodiments illustrated or described.

One of the causes for cylinder to cylinder variations in engine emissions is the asymmetry of the combustion process among the cylinders. It is also common for the exhaust gas recirculation channel connecting the intake and exhaust manifolds to be open in order to reduce emissions of oxides of nitrogen. In that case, cylinder to cylinder variations are propagated back to the intake manifold. Depending on the specific geometry of the manifold, the exhaust gas recirculation path, and the engine operating conditions, this may result in amplification of these cylinder to cylinder variations. The result will be highly asymmetric combustion conditions in individual cylinders. FIG. 1 is an example of such cylinder to cylinder variations. It shows actual data from a test engine plotting a signal representative of particulate matter in engine exhaust versus time. The time between peak values will vary depending on engine conditions and will not necessarily align with a cycle, but do appear to be predictable.

Figure 2:
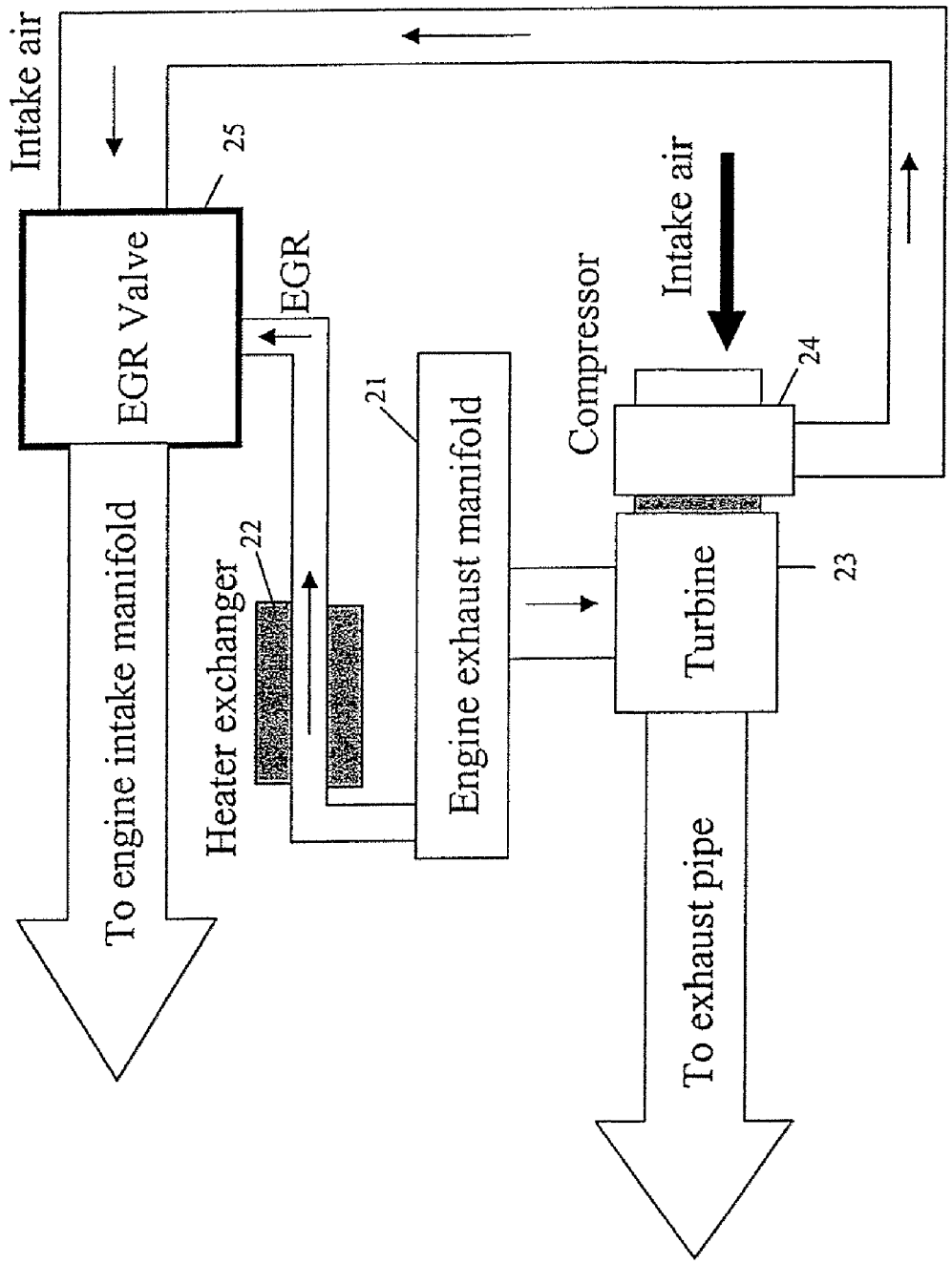
FIG. 2 is an example of a diagram of an engine exhaust gas recirculation system.

FIG. 2 is an example of a schematic diagram of an engine exhaust gas recirculation system, including an engine exhaust manifold 21, a heat exchange 22, a turbocharger including a turbine 23 and a compressor 24, and an exhaust gas recirculation valve 25. This is merely one example of a low pressure exhaust gas recirculation system. This invention is equally applicable to engines with other systems, such as high pressure exhaust gas recirculation systems, systems without turbochargers, etc.

Figure 3:
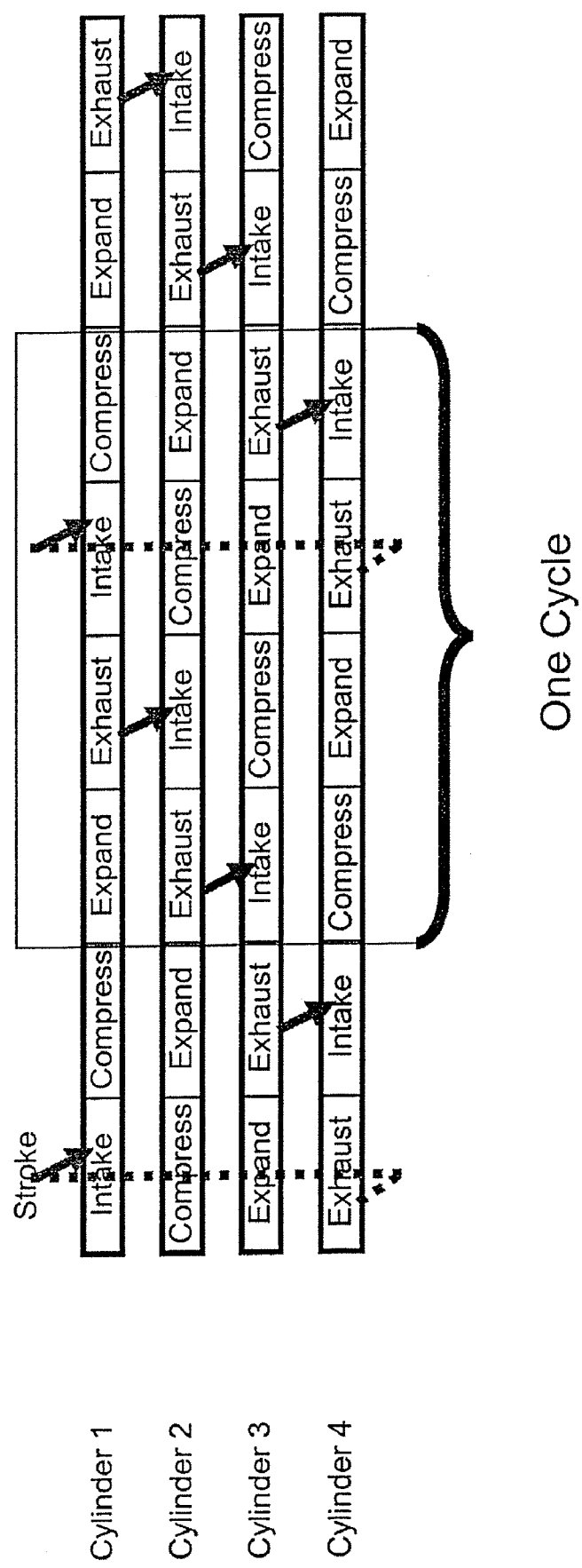
FIG. 3 illustrates how exhaust from one cylinder can affect the input conditions of different cylinders.

FIG. 3 illustrates a representation of different cylinders being at different stages of a cycle at any given time, and shows that the recirculated exhaust from one cylinder can affect the input conditions of different cylinders. For example, with a particular engine geometry and with a particular speed and load, recirculated gas from cylinder one may preferentially affect the intake of cylinder three, but may preferentially affect the intake of cylinders two and three at a different speed and load, etc. The exhaust of the preferentially affected cylinders will then preferentially affect the intake of certain cylinders, and so forth.

The invention uses a set of sensors in the intake and exhaust system, preferably with about a ten kilohertz sampling frequency. For example, particulate matter can be measured by monitoring charge. For example, an electric charge sensor can be built upon an automotive spark plug. See e.g. U.S. Pat. No. 6,971,258, incorporated herein by reference. These are examples of means for detecting particulate matter. Sensors for measuring oxides of nitrogen are known in the art. Such a sensor also can be built on a spark plug for installation in an engine. These are examples of means for detecting oxides of nitrogen.

The output signals of these sensors can provide high resolution real time monitoring for single cylinders, and cylinder to cylinder variations can be distinguished from those variations arising from the change of engine operating conditions, from slow drifts, and from background noise. The cylinder to cylinder variations can be extracted for further processing.

A profile for particulate matter and for oxides of nitrogen within one engine cycle (two revolutions for a four stroke engine) can be characterized by a set of variables, sufficiently representing possible variations. For example, those variables may include the composition (including concentrations of particulate matter and of oxides of nitrogen), the temperature, the pressure, and the flow, and it may include engine timing, percent exhaust gas recirculaltion, valve position, and other engine information.

A control algorithm can minimize the cylinder to cylinder variations by adaptive feedforward controlling the exhaust gas recirculation by means of an exhaust gas recirculation valve, injected fuel mixture and injection timing to achieve as uniform as possible profile of particulate matter and of oxides of nitrogen within one cycle. That is, instead of independent control of individual variables, and instead of straight feedback control, the control algorithm should adjust the input conditions of a cylinder based on the expected impact of recirculating exhaust gas. For a particular speed and load, a dynamic engine model predicts the impact on each cylinder intake caused by the exhaust of a given cylinder. For example, these may be affected by the manifold volume relative to an amount of air input during an input stroke. Furthermore, the timing of the impact of recirculating exhaust gas and the extent to which recirculating exhaust gas is fully stirred may vary depending on the engine geometry and the engine conditions. Sensors indicate the concentrations of particulate matter and of oxides of nitrogen on a cylinder by cylinder and cycle by cycle basis. The engine model should contemporaneously predict the cylinder intakes that will be affected by the recirculating exhaust gas, and adjustments are made to minimize cylinder to cylinder variations. Sensors in the intake system can provide data for measuring the actual input conditions for a cylinder firing. The engine model can be adjusted if it is not accurately predicting the impact of exhaust gas recirculation on a cylinder by cylinder basis.

An emissions control system may comprise, for example, the sensors, the engine model, and an engine control unit adapted for processing signals from the sensors, applying engine data to the engine model, adjusting engine parameters, detecting whether a cylinder intake composition corresponds with its predicted intake composition, and adjusting the engine model if a cylinder intake composition does not correspond with its predicted intake composition. These are examples of means for predicting an intake composition for a next cylinder firing, means for adjusting at least one engine parameter to compensate for the predicted intake composition in order to minimize variations in cylinder to cylinder emissions of particulate matter and of oxides of nitrogen, means for detecting whether an actual intake composition corresponded with the predicted intake composition, and means for adjusting the intake composition predicting means.

Figure 4:
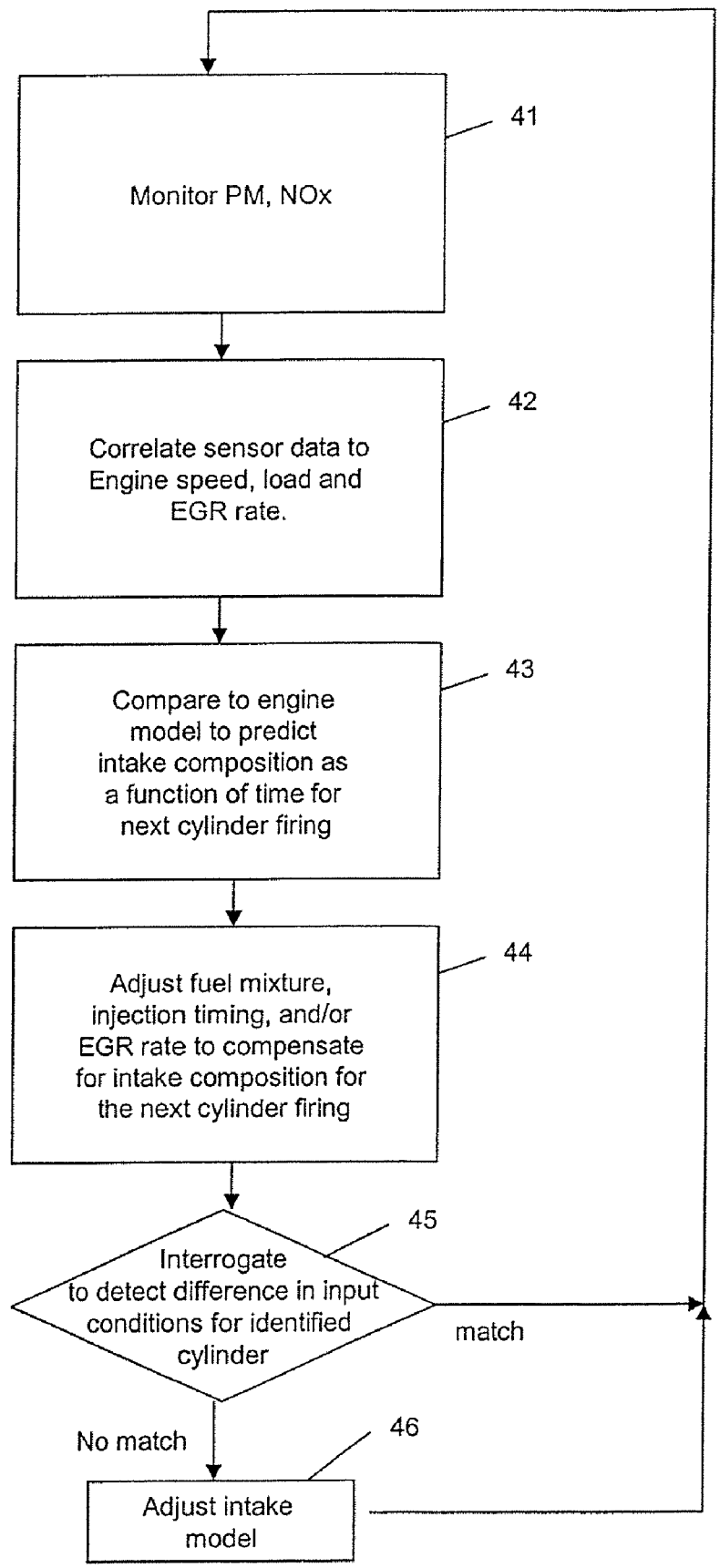
FIG. 4 is an example of a diagnostic flow chart.

The problem of minimizing cylinder to cylinder variations can be approached as a periodic multi-input multi-output minimum variance control problem. The control algorithm uses a semi-empirical model of the process obtained by combination of mathematical modeling and experiments. Specific features may depend on the particular engine, such as the geometry of the manifold and of the exhaust gas recirculation channel for example. There must be sufficient resolution to capture possible variations in the cycle profile. There can be inputs and variable parameters other than the manipulated ones, and they are treated as measured disturbances (intake manifold pressure, exhaust gas temperature, etc.). This is an example of means for predicting an intake composition for a next cylinder firing FIG. 4 is an example of a diagnostic flow chart. In this example, sensors monitor (41) the particulate matter and the oxides of nitrogen. The data derived from the sensors is correlated (42) with engine speed, engine load, and exhaust gas recirculation rate. This actual state of variables is compared (43) with an engine model to predict intake composition as a function of time for the next cylinder firing. If necessary, parameters such as fuel mixture, injection timing, and/or exhaust gas recirculation rate are adjusted (44) to compensate for the intake composition for the next cylinder firing. In the example of FIG. 2, there is then an interrogation (45) to detect whether the input conditions for the identified cylinder corresponded with what the engine model predicted. If they did not correspond, then the engine model is adjusted (46).

In some embodiments, the focus may be on controlling oxides of nitrogen and, in particular, on controlling variation in cylinder to cylinder emissions of oxides of nitrogen at the expense of variations in cylinder to cylinder emissions of particulate matter. For example, after-treatment such as filters may be used to control particulate matter regardless of variations in cylinder to cylinder emissions. The use of after-treatment filters to control particulate matter is a common configuration in North America. In some other embodiments, the focus may be on controlling particulate matter and, in particular, on controlling variations in cylinder to cylinder emissions of particulate matter at the expense of variations in cylinder to cylinder emissions of oxides of nitrogen. For example, an oxides of nitrogen trap such as a selective catalytic reduction trap may be used downstream to control oxides of nitrogen regardless of variations in cylinder to cylinder emissions. The use of downstream oxides of nitrogen traps is a common configuration in Europe. In still other embodiments, the focus may be on controlling variations in cylinder to cylinder emissions of both particulate matter and oxides of nitrogen.

The cylinder to cylinder variation control is used in addition to mean-value emission control. Mean-value emission control minimizes slower variations (spanning several cycles) and uses a much simpler cycle-averaged model.

From the foregoing, it will be observed that numerous modifications and variations can be effectuated without departing from the true spirit and scope of the novel concepts of the present invention. It is to be understood that no limitation with respect to specific embodiments shown or described is intended or should be inferred.

The invention claimed is:

1. A system for controlling engine emissions for an engine with exhaust gas recirculation, the system comprising:
   means for detecting, in exhaust gas of the engine, at least one of: particulate matter and oxides of nitrogen;
   means for predicting an intake composition for a next cylinder firing of the engine;
   means for adjusting at least one engine parameter to compensate for the predicted intake composition, in order to minimize variations in cylinder to cylinder emissions of at least one of: particulate matter and oxides of nitrogen.

2. The system as in claim 1, further comprising:
   means for detecting whether an intake composition for a cylinder firing corresponded with the predicted intake composition for said cylinder firing;
   means for adjusting the intake composition predicting means if the intake composition did not correspond with the predicted intake composition.

3. A system for controlling engine emissions for an engine with exhaust gas recirculation, the system comprising:
   at least one sensor for detecting, in exhaust gas of the engine, at least one of: particulate matter and oxides of nitrogen;
   an engine model for predicting an impact of exhaust gas from a single cylinder of the engine on intake composition of each cylinder of the engine, as a function of time, engine speed, and engine load.

4. The system as in claim 3, further comprising an engine control unit for adjusting at least one engine parameter to minimize variations in cylinder to cylinder emissions of at least one of: particulate matter and oxides of nitrogen.

5. The system as in claim 3, further comprising:
   an engine control unit;
   the engine control unit adapted for processing signals from the at least one sensor;
   the engine control unit adapted for applying engine data to the engine model for predicting an intake composition for a next cylinder firing of the engine, the engine data comprising data derived from the at least one sensor;
   the engine control unit adapted for adjusting at least one engine parameter to compensate for the predicted intake composition, in order to minimize variations in cylinder to cylinder emissions of at least one of: particulate matter and oxides of nitrogen.

6. The system as in claim 5, the engine data further comprising at least one of a group consisting of: a temperature, an exhaust gas temperature, a pressure, an intake manifold pressure, a flow indication, a fuel flow indication, an engine timing indication, an exhaust gas recirculation percentage, an exhaust gas recirculation rate, a valve position, an engine speed, and an engine load.

7. The system as in claim 5, the at least one engine parameter comprising at least one of a group consisting of: injected fuel mixture, injection timing, and exhaust gas recirculation rate.

8. The system as in claim 3, further comprising:
an engine control unit;
at least one sensor for detecting, in an intake system of the engine, at least one of: particulate matter and oxides of nitrogen;
the engine control unit adapted for applying engine data to the engine model for predicting an intake composition for a next cylinder firing of the engine, the engine data comprising data derived from the at least one exhaust gas sensor;
the engine control unit adapted for detecting whether an intake composition for a cylinder firing corresponded with the predicted intake composition for said cylinder firing, the intake composition being determined using data derived from the at least one intake system sensor;
the engine control unit adapted for adjusting the engine model if the intake composition did not correspond with the predicted intake composition.

9. The system as in claim 3, wherein the engine model depends, at least in part, on fixed properties of the engine.

10. The system as in claim 9, wherein the fixed engine properties comprise geometry of at least one of: a manifold of the engine and an exhaust gas recirculation channel of the engine.

11. The system as in claim 3, time resolution of the at least one sensor being sufficiently high to distinguish cylinder to cylinder variations from variations due to change of engine operating conditions, slow drifts, and background noise.

12. A method for controlling engine emissions for an engine with exhaust gas recirculation, the method comprising:
monitoring at least one of: a concentration of particulate matter in exhaust gas of the engine, and a concentration of oxides of nitrogen in exhaust gas of the engine;
compensating for an intake composition, predicted for a next cylinder firing of the engine, by adjusting at least one engine parameter to minimize variations in cylinder to cylinder emissions of at least one of: particulate matter and oxides of nitrogen.

13. The method as in claim 12, further comprising:
predicting the intake composition for the next cylinder firing, based on an engine model and a set of variables;
the set of variables comprising the at least one monitored concentration.

14. The method as in claim 13, further comprising:
detecting whether an intake composition for a cylinder firing corresponded with the predicted intake composition for said cylinder firing;
adjusting the engine model if the intake composition did not correspond with the predicted intake composition.

15. The method as in claim 13, wherein the engine model depends, at least in part, on fixed properties of the engine.

16. The method as in claim 15, wherein the fixed engine properties comprise geometry of at least one of: a manifold of the engine and an exhaust gas recirculation channel of the engine.

17. The method as in claim 13, wherein the engine model predicts an impact of exhaust gas from a single cylinder of the engine on intake composition of each cylinder of the engine, as a function of time, engine speed, and engine load.

18. The method as in claim 13, the set of variables further comprising at least one of a group consisting of: a temperature, an exhaust gas temperature, a pressure, an intake manifold pressure, a flow indication, a fuel flow indication, an engine timing indication, an exhaust gas recirculation percentage, an exhaust gas recirculation rate, a valve position, an engine speed, and an engine load.

19. The method as in claim 12, the at least one engine parameter comprising at least one of a group consisting of: injected fuel mixture, injection timing, and exhaust gas recirculation rate.

20. The method as in claim 12, time resolution of the monitoring step being sufficiently high to distinguish cylinder to cylinder variations from variations due to change of engine operating conditions, slow drifts, and background noise.

\* \* \* \* \*